United States Patent [19]

Oki

[11] Patent Number: 4,608,516
[45] Date of Patent: Aug. 26, 1986

[54] ELECTRON TUBE HAVING GLASS-TO-METAL-TO-GLASS SEAL

[75] Inventor: Hiroshi Oki, Chiba, Japan

[73] Assignee: Hitachi, Ltd., Tokyo, Japan

[21] Appl. No.: 233,448

[22] Filed: Feb. 11, 1981

[30] Foreign Application Priority Data

Mar. 12, 1980 [JP] Japan .................................. 58-30379

[51] Int. Cl.⁴ .......................... H01J 5/22; H01J 29/90
[52] U.S. Cl. ................................. 313/477 R; 313/318; 220/2.1 A
[58] Field of Search .................... 313/477 R, 479, 482, 313/317, 318, 220; 220/2.1 A, 2.1 R, 2.2, 2.3 R, 2.3 A

[56] References Cited

U.S. PATENT DOCUMENTS

| Re. 25,791 | 6/1965 | Claypoole | 220/2.1 A |
| 2,568,460 | 9/1951 | Nolte | 220/2.1 R |
| 3,061,664 | 10/1962 | Kegg | 220/2.1 R |

FOREIGN PATENT DOCUMENTS 946837 12/1948 France .................................. 313/318

OTHER PUBLICATIONS

*IBM Technical Disclosure Bulletin*, vol. 15, No. 8, Jan. 1973, "Gas Panel Sealant", Beckerman et al.

Primary Examiner—Palmer C. DeMeo
Assistant Examiner—Sandra L. O'Shea
Attorney, Agent, or Firm—Antonelli, Terry & Wands

[57] ABSTRACT

An electron tube is disclosed in which an envelope glass bulb and a glass stem having an electron gun assembly mounted thereon and accommodated within the bulb are sealed to each other. The sealed interface portion between the bulb and the stem incorporates concentrically with the electron gun assembly a metallic ring member made of an alloy or metal material having a good bonding ability to the glass materials of the bulb and the stem. The sealing is effected by a high frequency heating of the metallic ring member. An ohmic heating may be additionally used.

2 Claims, 14 Drawing Figures ent invention will be apparent when reading the following description in conjunction with the accompanying drawings, in which:

ELECTRON TUBE HAVING GLASS-TO-METAL-TO-GLASS SEAL

BACKGROUND OF THE INVENTION

The present invention relates to an electron tube and a method of fabricating the same, and more particularly to a sealed structure between a glass bulb and a glass stem.

In general, an electron tube, especially a color cathode-ray tube has structure such as shown in FIG. 1. An envelope or bulb 1 made of glass material is typically funnel-shaped and comprises a neck tube portion 1a, a funnel portion 1b and a panel portion 1c sealed to the large end of the funnel portion 1b through frit glass material. Within the neck tube 1a is accommodated an electron gun assembly 3a mounted on a usually disk-shaped stem and having a greater 3e attached thereto. A phosphor screen 4 is formed on the inner surface of the panel portion 1c. A shadow mask 5 positioned opposite to the phosphor screen 4 and apart therefrom by a predetermined distance is supported and fixed to the side wall of the panel portion 1c by a supporting member 6. To the end of the shadow mask 5 is attached an electron shield 7 for preventing reflected or secondary electrons due to the over-scanning of an electron beam from impinging upon the phosphor screen 4.

The fabrication of the color cathode-ray tube having the above structure is completed by sealing the stem to an open end of the neck tube 1a after the phosphor screen 4, the shadow mask 5, etc. have been incorporated into the envelope or bulb 1. This sealing process is carried out as follows. As understood from FIG. 2, a stem 3d, on which is mounted an electron gun assembly 3a having a plurality of electrodes fixed on a support of bead glass through leads 3b of the respective electrodes and which includes an exhaust tubulation 3f and outer pins 3c for drawing out the leads 3b, is received by a mount pin 8. The mount pin 8 is thereafter moved and positioned so that the electron gun assembly 3a is accommodated within the neck tube portion 1a of the bulb 1. Then, gas burner flames 9 act on the outer wall of the neck tube 1a around the stem 3d so that the neck tube 1a and the stem 3d are melted for sealing or fusing as shown by solid lines in FIG. 2 and an unnecessary portion or cullet 1a' of the neck tube 1a existing under the melt neck tube portion is burnt off. The burnt-off cullet 1a' remains attached to the mount pin 8 as shown.

For the above-described sealing process there is used an elaborate apparatus having a required high accuracy and the burner flames 9 are usually arranged in a multi-head rotating fashion.

However, the above sealing process involves some drawbacks. First, since the removal of the remaining cullet 1a' is carried out by cracking it, pieces of broken glass are scattered as fine fragments or powder. These finer glass fragments may sometimes enter into the bulb 1 from the exhaust tubulation 3f. Also, the finer glass fragments may frequently enter into the bulb 1 before the sealing between the neck tube 1a and the stem 3d since the steps for mounting the bulb and the stem in a sealing apparatus are carried out within an atmosphere containing the finer glass fragments. As a result, the finer glass fragments may be deposited on the shadow mask 5 accommodated within the bulb 1 to result in the plugging of the mask or the finer glass may be deposited on any locations in the bulb 1 to cause the generation of a discharge within the bulb during the operation of the fabricated tube due to a lowered degree of vacuum resulting in the deterioration of emission ability of a cathode. Second, since the gas burner system cannot provide a localized heating to only those portions of the neck tube 1a and of the stem 3d to be sealed to each other, the electron gun assembly 3a, especially the cathode and the first grid electrode near the stem may be excessively heated so that the electron gun assembly itself and/or the emission characteristic of the cathode is damaged.

The sealed structure is very weak against any mechanical shock since the sealed portion between the neck tube 1a and the stem 3d has an extremely small thickness as compared with the other portions of the neck tube and stem and includes various concentrated strains due to the forced heating by the burner flames.

The sealing process further involves a drawback that a positional relationship between the electron gun assembly 3a and the phosphor screen 4 cannot be attained with high accuracy since the outer wall of the neck tube 1a is heated by the burner flames 9 while the bulb 1 attached to a holder head is rotated both round its own axis and round the center axis of a sealing apparatus.

BRIEF DESCRIPTION OF THE INVENTION

An object of the present invention is to implement a sealed structure between a bulb and a stem capable of eliminating the above-described problems, thereby providing an electron tube and a fabrication method of the same whose performance, quality and reliability are high and which is inexpensive to manufacture.

According to one aspect of the present invention, there is provided an electron tube comprising an envelope or bulb of glass material having its end open, and a stem of glass material having an electron gun assembly mounted thereon and a periphery portion sealed to said open end of said envelope, said electron gun assembly being accommodated within said envelope, wherein said open end of said envelope and said periphery portion of said stem are sealed to each other through a metallic ring member which is made of a metallic material having a thermal expansion coefficient close to the glass materials of said envelope and said stem.

According to another aspect of the present invention, there is provided a method of fabricating an electron tube including a process of sealing an open end of an envelope or bulb of glass material to an upper peripheral surface portion of an electron gun assembly mounted on a stem of glass material, said sealing process comprising a first step of positioning on the upper peripheral surface portion of said stem a glass coated metallic ring member made of a metallic material having a thermal coefficient close to the glass materials of said envelope and said stem, a second step of placing the open end of said envelope onto said metallic ring member, and a third step of arranging a high frequency heating coil assembly around said metallic ring member and energizing said high frequency heating coil assembly to heat said metallic ring member, whereby said envelope and said stem are sealed to each other through said metallic ring member.

BRIEF DESCRIPTION OF THE DRAWINGS

The above and other objects and features of the present invention will be apparent when reading the following description in conjunction with the accompanying drawings, in which.

DESCRIPTION OF THE PREFERRED EMBODIMENTS

Figure 1:
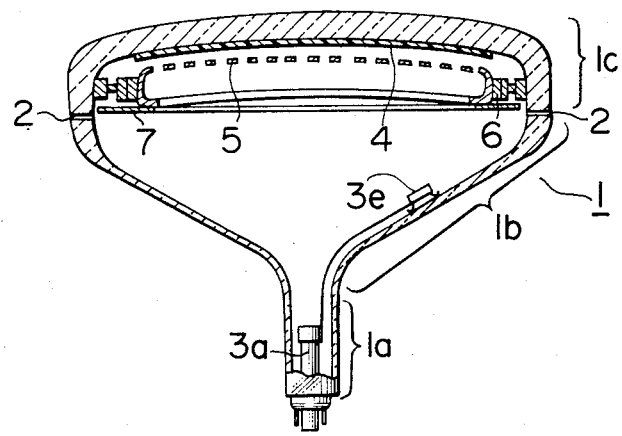
FIG. 1 is a cross section of an example of a color cathode-ray tube to which the present invention is applicable.
Figure 2:
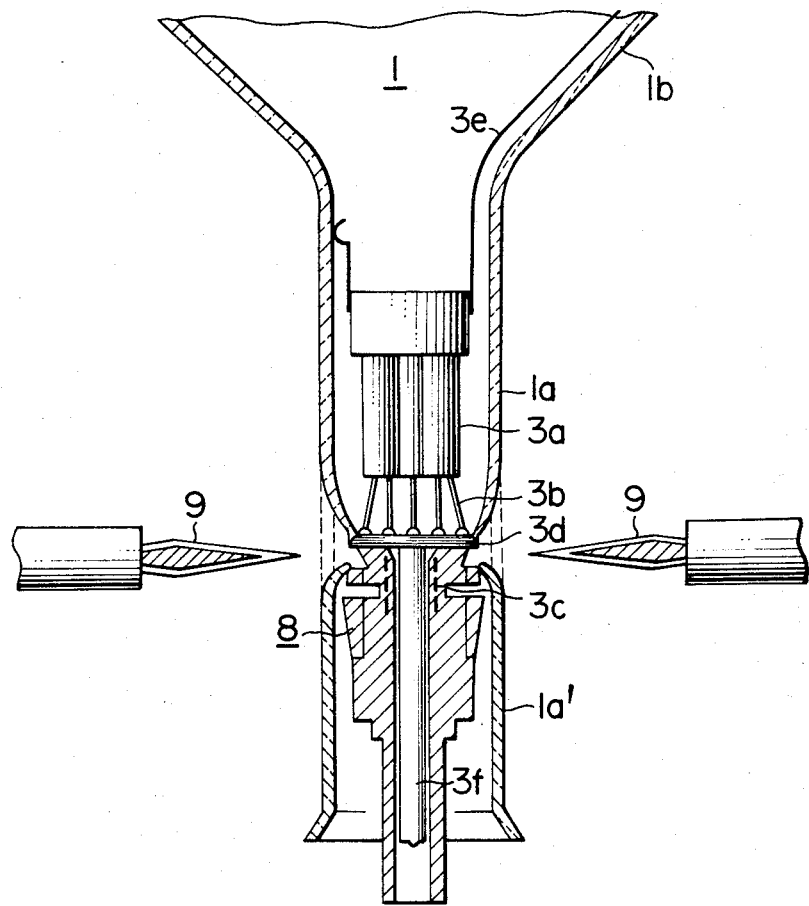
FIG. 2 is a detailed view in cross section for explaining the conventional sealing process in the fabrication method of a color cathode-ray tube.
Figure 3:
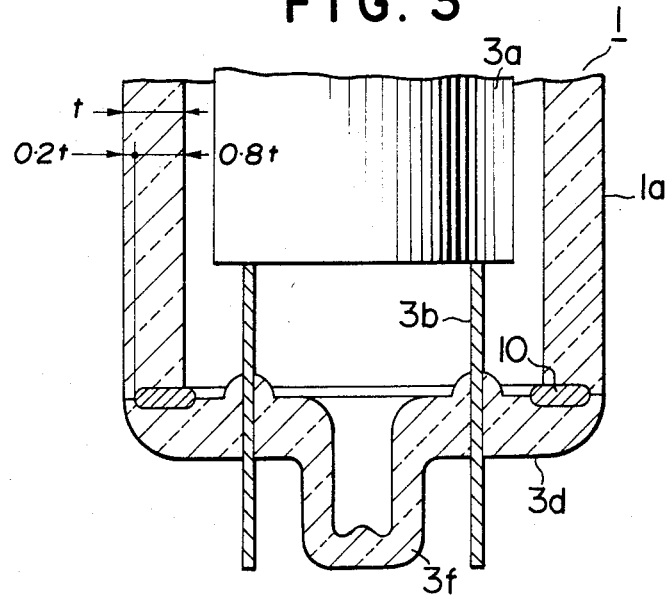
FIG. 3 shows in enlarged cross section the main part of an embodiment of a color cathode-ray tube according to the present invention.

Referring to FIG. 3 showing an enlarged cross section of the main part of an embodiment of a color cathode-ray tube according to the present invention, the same reference numerals and symbols as in FIGS. 1 and 2 are used for indicating similar or equivalent components. In FIG. 3, an interface between a neck tube 1a of a bulb 1 and a stem 3d having an electron gun assembly mounted thereon includes, concentrically with the electron gun assembly 3a, a thin metallic ring member 10 (for example, 0.1-0.6 mm thick) made of a metallic material, such as Fe-Cr alloy, Fe-Ni alloy, Fe-Ni-Cr alloy, Dumet (trade name) alloy (Fe-Ni, core having an overlay of Cu), Pt or Ni having a thermal expansion coefficient close to the glass materials (soft glass) of the neck tube 1a and the stem 3d. The dimensions of the metallic ring member 10 are selected such that its inner diameter is larger than the outer diameter of the electron gun assembly 3a and its outer diameter is smaller than the outer diameter of the neck tube 1a, preferably by about 0.2t (t: thickness of neck tube 1a).

Figure 4:
FIG. 4 shows in cross section an example of a metallic ring member used in the present invention.
Figure 5:
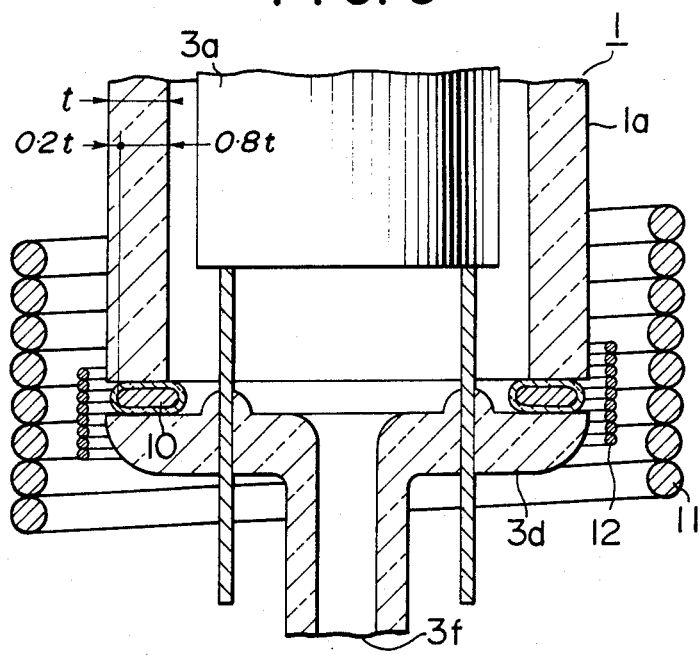
FIG. 5 is a cross-sectional view for explaining a sealing process in the fabrication method of the color cathode-ray tube shown in FIG. 3.

The color cathode-ray tube having such a structure is fabricated as follows. By using a metallic material having a thermal expansion coefficient approximately adapted to the glass materials of the neck tube 1a and the stem 3d, a thin metallic ring member 10 is formed which has its outer and inner diameters approximately corresponding to but slightly smaller than the outer and inner diameters of a predetermined neck tube 1a. The metallic ring member 10 is thereafter applied or sprayed with powders of glass having a property substantially equivalent to the glass materials of the neck tube 1a and the stem 3d, or powders of non-crystalline or amorphous glass (e.g. $PbO$-$B_2O_3$) having a low melting point. The resultant structure is subjected to a heating treatment so that the metallic ring member 10 is coated with a layer of glass, as shown in FIG. 4. Alternatively, the glass coating of the ring member 10 may be carried out by dipping or immersing the ring member 10 in a bath containing heated glass substance having a low viscosity. Next, as shown in FIG. 5, the glass coated ring member 10 is positioned on a predetermined location of the stem 3d. A bulb structure having the neck tube 1a of a preselected length and having been subjected to pretreatments, such as a phosphor screen forming process, is placed so as to enclose the electron gun assembly 3a mounted on the stem 3d and is slowly moved toward the stem 3d so that the ring member 10 is sandwiched between the open end of the bulb neck tube portion 1a and the upper surface of the periphery portion of the stem 3d. Thereafter, a high frequency (RF) heating coil assembly 11 is arranged concentrically with the ring member 10 around the neck tube 1a and the stem 3d while an ohmic heating coil (heating wire coil) assembly 12 is arranged concentrically with the ring member 10 between the high frequency heating coil assembly 11 and the ring member 10.

With the above arrangement, the high frequency heating coil 11 is first energized to heat the metallic ring member 10. As a result the glass coating formed on the metallic ring member 10 is melted and subsequently the glass material of the end portion of the neck tube 1a and the glass material of the upper surface portion of the stem contacting the heated ring member 10 are gradually melted so that the neck tube 1a and the stem 3d are substantially fused to each other through the ring member 10. Then, the ohmic heating coil 12 is energized. The current flowing through the coil 12 is so adjusted as to anneal and cool the fused interface portion of the neck tube 1a and the stem 3d. As a result, a sealed structure as shown in FIG. 3 is completed.

The arrangement of the ohmic heating coil 12 used for the purpose of annealing is not limited to the shown location. The ohmic heating coil 12 may be positioned at a location of the sealed neck tube and stem lifted up.

There may be a tendency that the fused portion of the neck tube 1a and the stem 3d has a sunken outline due to the high frequency heating. But, this tendency can be compensated or prevented by using the ohmic heating coil 12 to sufficiently heat and positively fuse the glass materials in the vicinity of the sealed interface portion of the neck tube 1a and the stem 3d. Though it may be presumed from FIG. 5 that the glass layer coated on the metallic ring member 10 is left in an exposed state, the glass material of the neck tube 1a and the glass material of the stem 3d are in fact fused to cover the outer side of the metallic ring member 10 since the ring member 10 is made thin. In preferred dimensions of the metallic ring member 10, the outer diameter of the ring member 10 is selected to be smaller than the outer diameter of the neck tube 1a by about 0.2t (t: thickness of neck tube 1a), as is mentioned above. Therefore, the end portion of the neck tube 1a and the upper surface portion of the stem 3d abutting against the ring member 10, i.e. corresponding to the about 0.8t thickness range of the neck tube 1a are fused by the high frequency heating while the portions thereof corresponding to the remaining thickness range of about 0.2t are fused by the ohmic heating. But, the respective shares of the high frequency coil 12 and the ohmic coil 11 with respect to fusing may be changed in dependence upon the energizing conditions of those coils. After the fusing of the glass, the energizing current of the ohmic coil 12 and/or the high frequency coil 11 is controlled so that the fused glass portion is gradually cooled to prevent strains from being produced as a result of an extremely large temperature difference between the metallic ring member and the neck tube and stem glass materials due to the high frequency heating.

When a glass material having a low melting point is used as the glass to be coated on the metallic ring member 10, the time required for sealing can be shortened and the strength of an adhesion of the metallic ring to the bulb and the stem after sealing can be improved.

The thus fabricated color cathode-ray tube incorporating the metallic ring member 10 concentric with the electron gun assembly 3a in a sealed interface portion between the end of the neck tube 1a and the upper surface of the stem 3d provides an advantage that an external magnetic flux such as a geomagnetic field passing through the bulb 1 in the direction of the tube axis can be reduced or shielded, thereby preventing adverse effects of the external magnetic field upon the characteristics such as color purity of the color cathode-ray tube. This magnetic shielding effect is remarkable when the sealed structure according to the present invention is applied to an image pickup tube which is liable to be influenced even by a very weak magnetic field.

Since the sealed interface portion is prevented from becoming thin by virture of the metallic ring member 10, the sealed portion has a greatly improved mechanical strength.

The above-described sealing process does not require any extra portion of the neck tube 1a such as the cullet 1a' (see FIG. 2) because of the combined use of the high frequency heating and the ohmic heating. Therefore, it is free from the plugging of the shadow mask apertures and/or the deterioration of the emission ability of the cathode which may take place in association with the generation of fine glass fragments due to the removal of the cullet 1a' through cracking. Second, since the bulb neck tube portion 1a is shortened by about 40 mm in comparison with the conventional neck tube including an extra portion corresponding to a cullet and can be used at a starting point, the cost of the bulb 1 itself as well as the cost of bulb transport can be reduced by about 10%.

Though the inability of the conventional gas burner system to locally heat only portions to be sealed would result in thermal damage of the electron gun assembly (especially the cathode and the first grid electrode) due to its excessive heat and/or the deterioration of emission characteristic of the cathode, these problems can be solved by the present invention since the high frequency heating used in the present invention can employ a so-called short ring scheme.

The sealing process does not require any rapid rotation and stop operations including the rotation of the bulb 1 round its own axis and round the center axis of a sealing apparatus for sealing between the neck tube 1a and the stem 3d. Therefore, no expensive sealing apparatus is required and the positional relationship between the electron gun assembly and the phosphor screen can be maintained with high accuracy. The lack of any requirement for rotating the bulb also permits performance of the sealing work in the course of carriage of the bulb on a conveyer or the like.

The sealing process requires no combustion gas. Accordingly, the sealing work can be conducted in a clean room, which leads to the improvement of characteristics of the fabricated color cathode-ray tube because of a lowered possibility that alien substances, such as dust, may enter into the bulb 1.

The sealing process is free from any operations requiring a high skilled worker as required in the conventional gas burner sealing method, including glass-working such as the burn-off of the extra cullet and the annealing of the sealed portion.

Figure 6:
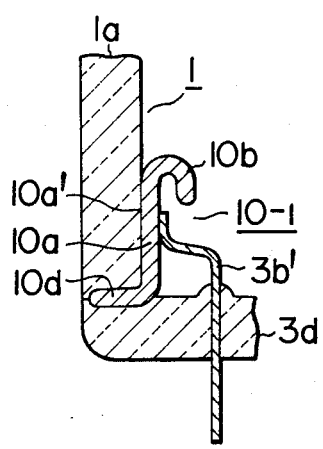
FIG. 6 shows in enlarged cross section the main part of another embodiment of a color cathode-ray tube according to the present invention.

FIG. 6 shows the main part of another example of a color cathode-ray tube according to the present invention. As seen from the figure, a metallic ring member 10-1 made of the same material as described above is cylindrically shaped. A cylindrical portion 10a of the ring member 10-1 extends along the inner wall of the neck tube 1a and is exposed in the neck tube 1a while a flange portion 10d of the ring member 10-1 is interposed between the neck tube 1a and the stem 3d.

A part of the exposed cylindrical portion 10a of the metallic ring member 10-1 may be connected through a lead 3b' to an outer pin which is adapted to carry an externally and controllably applied voltage for developing a uniform potential distribution on the inner wall of the bulb 1 near the stem 3d. For example, the application of several volts (corresponding to the potential level applied to the second grid electrode) to the metallic ring member 10-1 through the outer pin causes the collection of electrons on the inner wall of the neck tube 1a, thereby improving the characteristics of the color cathode-ray tube. Also, a metallic coil, a metallic mesh or the like adapted to be connected to a lead applied with an externally controlled potential may be attached to the metallic ring member 10-1 in order to form a desired potential region in the vicinity of the inner wall of the neck tube 1a. Such an application of electric potential eliminates a problem that various changing potential conditions developed on the inner insulating surface of the neck tube 1a due to contamination or electron absorption may otherwise distort the potential distribution formed by the electron gun assembly or cause a discharge in the tube.

The metallic ring member 10-1 shown in FIG. 6 is designed such that the outer side 10a' of the cylindrical portion 10a serves as a reference guide abutting against the inner wall of the neck tube, whereby the ring member is prevented from being arranged eccentrically with the neck tube and the stem. The cylindrical portion 10a of the ring member 10-1 is further provided with a folded portion 10b for preventing the formation of a sharp edge at one end of a potential distribution produced by the application of a potential to the ring member.

Figure 7A:
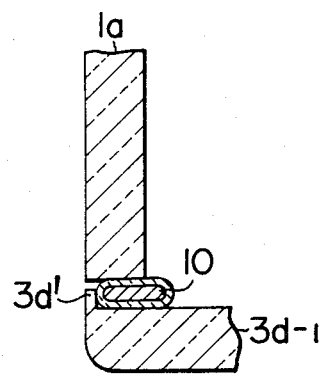
FIGS. 7A and 7B are cross-sectional views for explaining other sealing processes in the fabrication method of a color cathode-ray tube according to the present invention.

FIG. 7A illustrates another example of the fabrication method for a color cathode-ray tube according to the present invention. A stem 3d-1 shown in FIG. 7 is different from that of FIG. 5 in that the upper surface of the stem 3d-1 is integrally provided with a raised edge portion 3d' having its height substantially equal to that of the glass coated metallic ring member 10 prepared in the manner described with reference to FIG. 4. The glass coated ring member 10 is placed inside of the raised edge portion 3d' and the neck tube 1a is thereafter placed onto the ring member 10. The subsequent heating step as described in reference to FIG. 5 provides a similar sealed structure. In accordance with this fabrication method, the provision of the edge portion 3d' prevents the ring member 10 from being arranged eccentrically with respect to the neck tube 1a and the stem 3d-1 and permits the formation of a further strengthened sealed portion exhibiting a good appearance.

Figure 7B:
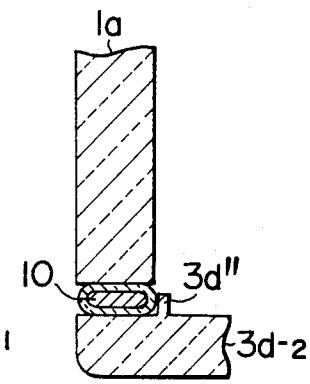

FIG. 7B shows a stem 3d-2 similar to the stem 3d-1 of FIG. 7A but different in that the upper surface is formed with its raised portion 3d''' adapted to abut against the inner side of the glass coated ring member 10, thereby providing an effect similar to the example of FIG. 7A.

Figure 8:
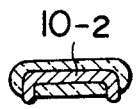
FIGS. 8 to 12 show in cross section other examples of a metallic ring member used in the present invention.
Figure 9:
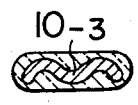

FIGS. 8 and 9 shows other examples of a metallic ring member which can be used in the present invention. The ring member 10-2 shown in FIG. 8 has its cross section of gib shape and the ring member 10-3 shown in FIG. 9 has its cross section of waved shape. These ring members exhibit good thrust into the stem and/or neck tube, whereby providing a rigid sealed structure having an improved bonding strength. Though the ring member 10-2 shown in FIG. 8 has two teeth portions, the number of teeth portions may be at least one.

Figure 10:
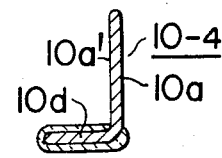
Figure 11:
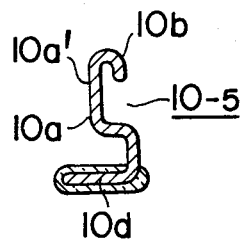
Figure 12:
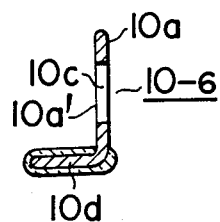

Further examples of a metallic ring member which can be used in the present invention are shown in FIGS. 10 to 12. The ring member 10-4 shown in FIG. 10 is integrally provided with a cylindrical portion 10a inside thereof, the ring member 10-5 shown in FIG. 11 includes inside thereof a stepped cylindrical portion 10a having a folded end portion 10b, and the ring member 10-6 shown in FIG. 12 includes inside thereof a cylindrical portion 10a having slits 10c extending in a direction of the tube axis. The cylindrical portion 10a of each ring member is designed such that its outer side 10a' serves as a reference guide abutting against the inner wall of the neck tube 1a, whereby the ring member is prevented from being arranged eccentrically with respect to the neck tube and the stem. The stepped cylindrical portion 10a of the ring member 10-5 shown in FIG. 11 has a larger exposed area so that the efficiency of the ring member to collect electrons on the inner surface of the bulb can be improved.

Figure 13:
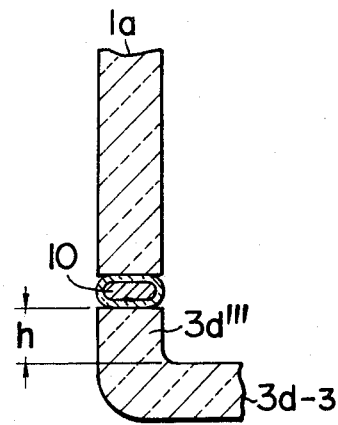
FIG. 13 is a cross-sectional view for explaining a further sealing process in the fabrication method of a color cathode-ray tube according to the present invention.

FIG. 13 shows a view for explaining a further embodiment of the fabrication method of a color cathode-ray tube according to the present invention. Though in the embodiments of FIGS. 5, 7A and 7B the metallic ring member has been placed on the stem having a generally flat surface, the embodiment shown in FIG. 13 employs a stem 3d-3 whose upper periphery surface is provided integrally with a cylindrical portion 3d''' having a proper height h (for example, 0.5–5 mm) and having substantially the same width as the thickness of the neck tube 1a. With the stem 3d-3, the ohmic heating as described in reference with FIG. 5 effectively acts on the cylindrical portion 3d''' though the embodiments of FIGS. 5, 7A and 7B has a possibility that when the stem is heated by the ohmic coil 12 the generated heat may propagate toward the central portion of the stem and thereby not provide a sufficient heating of the stem glass material to be fused.

Though the preceding embodiments have been described in conjunction with color cathode-ray tubes, the present invention is not limited to them. The present invention is widely applicable to so-called electron tubes including color cathode-ray tubes, black and white cathode-ray tubes, observation purpose or measuring cathode-ray tubes, image pickup tubes, etc. The material suitable for the metallic ring member has been exemplified in conjunction with the case of the color cathode-ray tube employing a soft glass. In the case where a hard glass is employed as in an image pickup tube, Kovar (Fe-Ni-Co alloy), W or Mo may be used as the ring member material.

Also, the preceding embodiments have been described and illustrated for the case where the metallic ring member is interposed between the neck tube and the stem. But, the metallic ring member may be incorporated into the neck tube glass material or the stem glass material in the immediate vicinity of the interface between the neck tube and the stem to be sealed. The use of the stem preliminarily incorporating the ring member eliminates the above-disclosed limitation that the inner diameter of the ring member should be selected to be larger than the outer diameter of the electron gun assembly since the ring member is inserted to enclose the electron gun assembly mounted on the stem.

What is claimed is:

1. An electron tube comprising an envelope of glass material having its end open, and a stem of glass material having an electron gun assembly mounted thereon and a periphery portion sealed to said open end of said envelope, said electron gun assembly being accomodated within said envelope, wherein said open end of said envelope and said periphery portion of said stem are sealed to each other through a metallic ring member which is made of a metallic material having a thermal expansion coefficient close to the glass materials of said envelope and said stem, a portion of said metallic ring member between said open end of said envelope and said periphery end of said stem being coated with a layer of a low melting glass which is made of a glass material which is different from the glass materials of said envelope and said stem, the outer diameter of said metallic ring member being smaller than the outer diameter of a portion of said envelope in the vicinity of the sealed interface between said envelope and said stem, said metallic ring member including a cylindrical portion extending along the inner wall of said envelope and exposed in said envelope, said cylindrical portion of said metallic ring member being stepped.

2. An electron tube comprising an envelope of glass material having its end open, and a stem of glass material having an electron gun assembly mounted thereon and a periphery portion sealed to said open end of said envelope, said electron gun assembly being accomodated within said envelope, wherein said open end of said envelope and said periphery portion of said stem are sealed to each other through a metallic ring member which is made of a metallic material having a thermal expansion coefficient close to the glass materials of said envelope and said stem, a portion of said metallic ring member between said open end of said envelope and said periphery end of said stem being coated with a layer of a low melting glass which is made of a glass material which is different from the glass materials of said envelope and said stem, the outer diameter of said metallic ring member being smaller than the outer diameter of a portion of said envelope in the vicinity of the sealed interface between said envelope and said stem, said metallic ring member including a cylindrical portion extending along the inner wall of said envelope and exposed in said envelope, said cylindrical portion of said metallic ring member including a plurality of slits in a direction of the electron tube axis.

* * * * *